Jan. 16, 1934. J. MELIO 1,943,769
FLUSHING TANK VALVE
Filed April 16, 1930
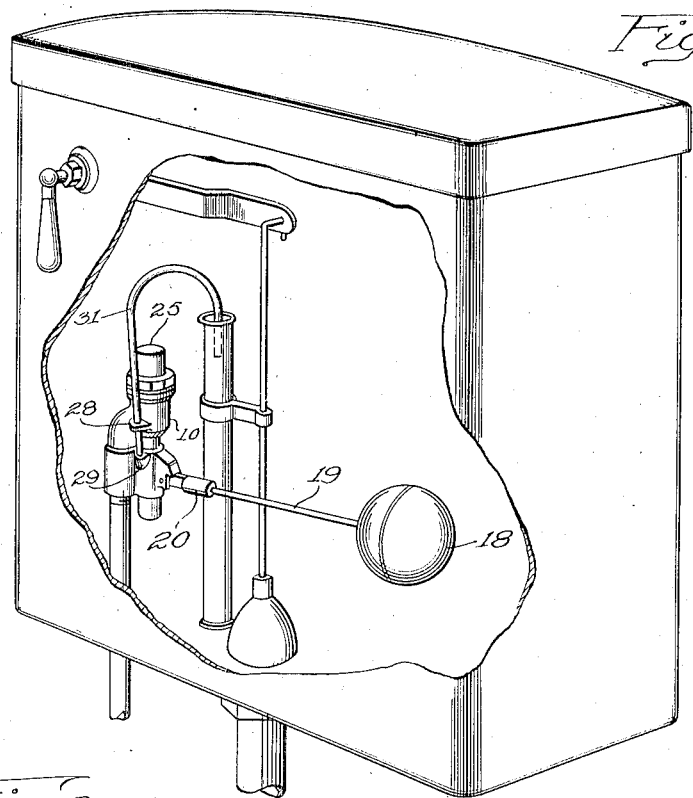
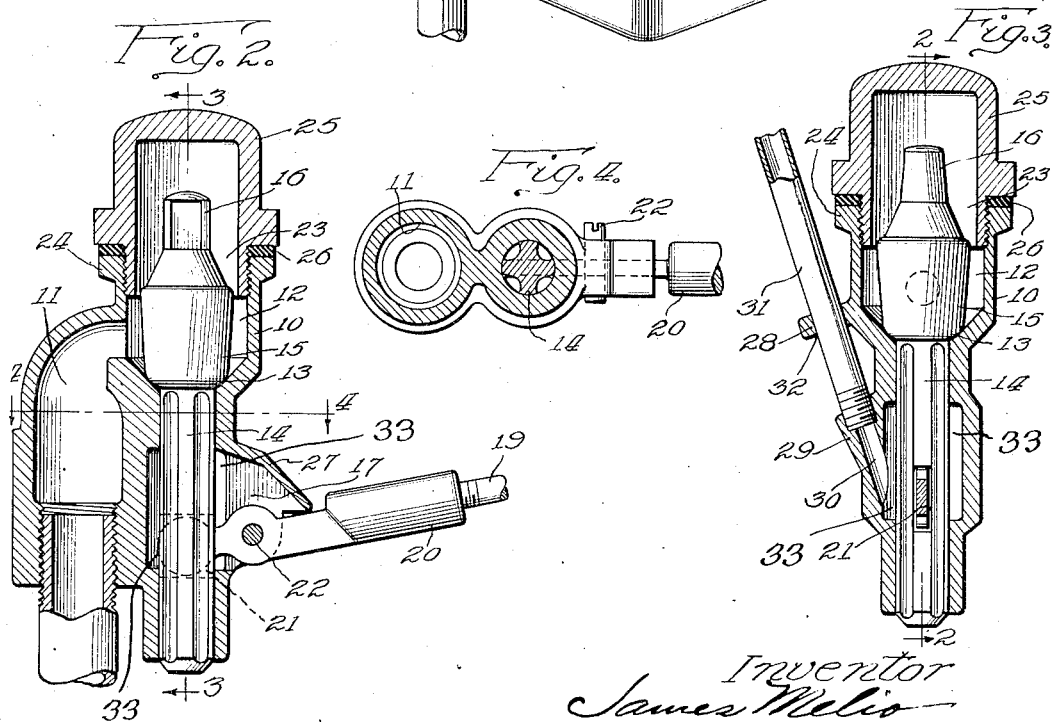

Patented Jan. 16, 1934

1,943,769

UNITED STATES PATENT OFFICE 1,943,769

FLUSHING TANK VALVE

James Melio, Chicago, Ill.

Application April 16, 1930. Serial No. 444,739

1 Claim. (Cl. 137—104)

The main objects of this invention are to provide an improved valve structure of compact and simplified form; to provide a valve casing so constructed that when mounted within a reservoir, the valve portion thereof will be readily accessible for replacement in the event of leakage; to provide a valve having an auxiliary water outlet with means preventing the water issuing therefrom from spraying over the top edges of the tank.

A specific embodiment of this invention is shown in the accompanying drawing in which:

Figure 1 is a fragmentary perspective view of my valve assembled in a standard flushing reservoir.

Fig. 2 is a vertical sectional view on the line 2—2 of Fig. 3.

Fig. 3 is a vertical sectional view on the line 3—3 of Fig. 2.

Fig. 4 is a sectional view taken on the line 4—4 of Fig. 2.

In the drawing, 10 indicates a casing preferably cast having a water inlet passage 11 and an outlet passage 12. A valve seat 13, formed in the outlet passage 12, provides a seat for a rubber valve closure member 15 which is mounted on the upper end of a longitudinally slotted valve stem 14.

The extreme upper portion of the stem 14 is externally threaded (not shown) throughout a part of its length and is adapted to receive an internally threaded cap 16 which functions to fix the valve 15 on the valve stem 14.

The valve actuating mechanism consists of the usual float 18 having an arm 19 fixed thereto, the inner end of said arm being threaded into a cam lever 20 which extends through a slot 21 in the valve stem 14, and is pivotally mounted on a threaded fulcrum pin 22 which passes through alined apertures in lugs on the wall of an auxiliary water outlet passage 17. Said passage 17 is formed in the side wall of the water outlet passage 12.

In forming the casing 10, an opening 23 is provided, through which the assembled valve is introduced. The wall surrounding the said opening 23 is flanged as at 24 to provide a seat for an internally threaded cap 25, the threads thereof being adapted to engage internal threads on the inner wall of the passage 12, adjacent the opening 23 and in this manner effect closure of the said opening 23. In order that the opening 23 may be effectively sealed, a washer 26 is interposed between the flange 24 and a corresponding flange on the cap 25.

In casting the shell 10, a lip 27 is also formed, which projects from the outer wall of said shell over and above the auxiliary opening 17, so that water flowing therefrom will be deflected downwardly toward the bottom of the reservoir in which the valve is mounted.

The valve shell 10 also has a shoulder 28 and a boss 29 formed thereon, said boss being drilled so as to provide a passage 30 which communicates with the outlet passage 12 at a point below the valve seat 13. The passage 30 is threaded to receive a correspondingly threaded standard overflow tube 31 which tube is effectively braced by its first being passed through an aperture 32 in the projecting shoulder 28 and then fixed in the passage 30. When the device is positioned within the reservoir, it is often necessary to bend the said tube, so as to cause it to exhaust in the proper place within the reservoir and the supporting shoulder 28 serves to prevent the tube from being broken off at the point of engagement with the passage 30 when pressure necessary to bend the said tube is applied.

An annular chamber 33 is formed in the medial portion of the outlet passage 12, and is adjacent to and communicates with the auxiliary exhaust outlet 17 and the overflow pipe 31, and is arranged and adapted to create a back pressure for forcing part of the water upwardly through the overflow pipe 31 and outwardly through the auxiliary exhaust opening 17 when the valve mechanism is opened and the incoming water flows downwardly through the outlet opening 12.

The device functions as follows:

The assembled valve casing is screwed onto the water inlet pipe which usually extends vertically from the bottom of the flush tank, the threads in the inlet passage engaging corresponding threads on the exposed end of the inlet pipe. The arm carrying the float is then assembled on the cam arm 20, the overflow pipe positioned to exhaust into the overflow receptacle in the tank and the water turned on.

As the actuating mechanism functions to hold the valve in open position when the level of the water in the reservoir is below the lowest position of the float, the inrushing water will flow through the inlet passage into the outlet passage; thence around the valve closure means which is now opened; down along the sides of the grooved valve stem, and out through the outlet into the reservoir. It is to be noted that the outlet opening is partially choked by the grooved valve stem which tends to restrict the flow of water through the said opening and in this manner slow up the filling process. To overcome this obstacle, I mount the actuating mechanism in a manner as to leave an opening therearound comprising the auxiliary exhaust outlet 17, from which the water may flow and as the water flows through the said opening with considerable force, I provide the deflector 27 to prevent said water from being sprayed over the top edges of the reservoir.

As the water rises in the reservoir, it will finally contact the float and cause it to rise, which action actuates the valve assembly and causes the valve to finally seat, whereupon the inflow of water from the inlet pipe will be stopped. The annular chamber 33 in the exhaust orifice also functions to build up sufficient pressure within the valve to force water through the overflow passage and tube into the overflow receptacle from which it is conveyed to the toilet bowl over which the flush bowl is suspended. As the overflow passage is positioned below the valve seat, when the valve is closed, water will cease to flow into the overflow receptacle.

When the toilet bowl is flushed, the reservoir begins to empty and as the water therein recedes the float will follow the level of said water, which action opens the valve and the refilling process begins.

Although but one specific embodiment of this invention is herein shown and described, it will be understood that numerous details of the construction shown may be altered or omitted without departing from the spirit of this invention as defined by the following claim.

I claim:

A flush valve comprising an integral shell having inlet and outlet passages, and a valve disposed in said shell and having a longitudinally slotted stem located in said outlet passage, said shell having an auxiliary exhaust opening in the lower portion of the side wall of said outlet passage, and there being an annular chamber in the lower portion of the side wall of the outlet passage adjacent said exhaust opening to create back pressure for forcing water through said opening, an overflow pipe adjacent to and communicating at one end with said auxiliary exhaust opening and said annular chamber and at the other end indirectly to the toilet bowl, the said back pressure created in said annular chamber also being adapted to force water upwardly through said overflow pipe.

JAMES MELIO.